United States Patent
Zhang

(10) Patent No.: US 10,536,346 B2
(45) Date of Patent: Jan. 14, 2020

(54) DATA PROCESSING METHOD AND DEVICE

(71) Applicant: HUAWEI TECHNOLOGIES CO., LTD., Shenzhen (CN)

(72) Inventor: Jianming Zhang, Suzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 115 days.

(21) Appl. No.: 15/894,909

(22) Filed: Feb. 12, 2018

(65) Prior Publication Data

US 2018/0241640 A1    Aug. 23, 2018

(30) Foreign Application Priority Data

Feb. 20, 2017 (CN) .......................... 2017 1 0089865

(51) Int. Cl.
*H04L 12/24* (2006.01)
*H04L 12/931* (2013.01)

(52) U.S. Cl.
CPC .............. *H04L 41/30* (2013.01); *H04L 49/00* (2013.01); *H04L 49/70* (2013.01)

(58) Field of Classification Search
None
See application file for complete search history.

(56) References Cited

U.S. PATENT DOCUMENTS

| 2003/0012204 A1* | 1/2003 | Czeiger ............. H04L 29/12584 370/401 |
| 2015/0078392 A1* | 3/2015 | Yan ..................... H04L 49/3054 370/410 |
| 2015/0195102 A1* | 7/2015 | Mochida ............... H04L 12/437 370/223 |
| 2015/0249599 A1 | 9/2015 | Song et al. |
| 2016/0277214 A1 | 9/2016 | Guntaka et al. |

* cited by examiner

*Primary Examiner* — Brian Whipple
(74) *Attorney, Agent, or Firm* — Kilpatrick Townsend & Stockton LLP

(57) ABSTRACT

Embodiments of this application disclose a data processing method and a device, so that a controller can also participate in a procedure of electing an active switch, thereby avoiding a problem in the prior art caused by a registration failure when an active switch determined by means of switch election registers with a controller, and improving active switch election efficiency. The method in the embodiments of this application includes: receiving, by a controller, registration requests of multiple switches in a same stack system, where the multiple switches include a target switch; and if the controller determines that the target switch meets a registration success condition, sending, by the controller, a registration success message to the target switch, and selecting the target switch as an active switch.

20 Claims, 4 Drawing Sheets

DATA PROCESSING METHOD AND DEVICE

CROSS-REFERENCE TO RELATED APPLICATION

This application claims priority to Chinese Patent Application No. 201710089865.3, filed on Feb. 20, 2017, which is hereby incorporated by reference in its entirety.

TECHNICAL FIELD

This application relates to the communications field, and in particular, to a data processing method and a device.

BACKGROUND

A cluster switching system (CSS, Cluster Switch System), also referred to as a stack, means that multiple switches are combined together and virtualized into one switching device. When a stack is set up, switches that form the stack send a stack contention packet to each other, to elect an active switch according to a preset rule, and the active switch is used to manage the cluster switch system.

After the active switch is determined, only the active switch can register with a controller. The active switch sends a registration request to the controller, and the active switch and the controller interact with each other after a channel is established.

However, in the prior art, after an active switch is elected, the active switch does not change, and only the active switch can register with a controller. If the registration of the active switch fails, the active switch continuously initiates new registration. When the active switch does not change, a result is still a registration failure. As a result, a stack device is in a hosted state for a long time until intervention of operation and maintenance personnel.

SUMMARY

This application provides a data processing method and a device, so that a controller can also participate in a procedure of electing an active switch, thereby improving active switch election efficiency.

According to a first aspect, this application provides a data processing method, where the method includes: receiving, by a controller, registration requests of multiple switches in a same stack system, where the multiple switches include a target switch; determining, by the controller, whether the target switch meets a registration success condition; and if the controller determines that the target switch meets the registration success condition, sending, by the controller, a registration success message to the target switch, and selecting the target switch as an active switch.

It can be learned that, in this application, the controller participates in a procedure of electing the active switch. The controller receives the registration requests from the multiple switches in the same stack system and determines the first switch that meets the registration success condition as an active switch. This avoids a problem in the prior art caused by a registration failure when an active switch determined by means of switch election registers with a controller, and improves active switch election efficiency.

In a first possible implementation of the first aspect, that the controller determines that a target switch meets the registration success condition includes: querying, by the controller, for actual stack information of the target switch, where the actual stack information is information about a stack to which the target switch actually belongs; if the actual stack information of the target switch matches preset stack information of the controller, querying, by the controller, whether there is an active switch that has been successfully registered, where information about a stack that is preset by the controller and that includes the target switch is referred to as the preset stack information; if there is no active switch that has been successfully registered, querying, by the controller, for basic information of the target switch; and if the basic information of the target switch is verified, determining, by the controller, that the target switch meets the registration success condition.

In a second possible implementation of the first aspect, the basic information includes but is not limited to a device type, model, and version of the target switch.

It can be learned that there may be multiple conditions for the controller to determine whether the target switch meets the registration success condition, and when all the multiple conditions are met, it is determined that the target switch meets the registration success condition. This enriches implementations of this application.

In a third possible implementation of the first aspect, the querying, by the controller, for actual stack information of the target switch includes: sending, by the controller, a stack information query request to the target switch, and receiving, by the controller, the actual stack information sent by the target switch; and the querying, by the controller, for basic information of the target switch includes: sending, by the controller, a basic information query request to the target switch, and receiving, by the controller, the basic information sent by the target switch.

It can be learned that the controller may obtain the actual stack information of the target switch by sending the stack information query request, and may obtain the basic information of the target switch by sending the basic information query request. This is more targeted.

In a fourth possible implementation of the first aspect, the querying, by the controller, for actual stack information of the target switch includes: sending, by the controller, a query request to the target switch, where the query request is used to obtain the actual stack information and the basic information of the target switch; and receiving, by the controller, the actual stack information and the basic information that are sent by the target switch.

It can be learned that the controller may alternatively obtain the actual stack information and the basic information by sending one query request to the target switch. This reduces signaling interaction between the controller and the target switch.

In a fifth possible implementation of the first aspect, after the querying, by the controller, for actual stack information of the target switch, the method further includes: if the actual stack information of the target switch does not match the preset stack information of the controller, generating, by the controller, an alarm information. A mismatch may occur when a stack is split, or there is a configuration error in the controller, or the like, and the alarm information may be used to notify management personnel that the stack is split or there is the configuration error.

It can be learned that this application may further be applied to stack splitting detection.

In a sixth possible implementation of the first aspect, after the querying, by the controller, whether there is an active switch that has been successfully registered, the method further includes: if there is an active switch that has been successfully registered, sending, by the controller, a registration failure message to the target switch, where the registration failure message includes information about the active switch that has successfully registered.

It can be learned that, if there is an active switch that has been successfully registered, the controller may notify the target switch that an active switch already exists, so that after knowing the information about the active switch, the target switch becomes a standby switch and stops sending the registration request to the controller. This can reduce signaling interaction.

In a seventh possible implementation of the first aspect, after the querying, by the controller, for basic information of the target switch, the method further includes: if the basic information of the target switch fails to be verified, sending, by the controller, the registration failure message to the target switch.

It can be learned that, if the basic information of the target switch fails to be verified, the controller sends the registration failure message to the target switch. This can further improve a procedure of this application.

In an eighth possible implementation of the first aspect, the actual stack information is an identifier set of switches in the stack to which the target switch actually belongs, the identifier set of the switches in the stack to which the target switch actually belongs includes an identifier of the target switch, and after the querying, by the controller, for actual stack information of the target switch, the method further includes: querying, by the controller, for the preset stack information according to the identifier of the target switch, where the preset stack information is an identifier set of switches in the stack to which the target switch is preset to belong; determining, by the controller, whether the actual stack information of the target switch matches the preset stack information of the controller; and if the identifier set of the switches in the stack to which the target switch actually belongs matches the identifier set of the switches in the stack to which the target switch is preset to belong, determining, by the controller, that the actual stack information of the target switch matches the preset stack information of the controller; or if the identifier set of the switches in the stack to which the target switch actually belongs does not match the identifier set of the switches in the stack to which the target switch is preset to belong, determining, by the controller, that the actual stack information of the target switch does not match the preset stack information of the controller.

In a ninth possible implementation of the first aspect, an identifier can uniquely identify each switch, and includes but is not limited to a sequence number or a MAC address.

According to a second aspect, this application further provides a data processing method, where the method includes: sending, by a target switch in a no-active state, a registration request to a controller, where the target switch is one of multiple switches that send registration requests to the controller, and the multiple switches belong to a same stack system; and if the target switch receives a registration success message sent by the controller, determining, by the target switch, itself as an active switch.

It can be learned that, in this application, the target switch and another switch in the same stack system send registration requests together to the controller, and the controller also participates in a procedure of electing the active switch. This avoids a problem in the prior art caused by a registration failure when an active switch determined by means of switch election registers with a controller, and improves active switch election efficiency.

In a first possible implementation of the second aspect, after the receiving, by the target switch, a registration success message sent by the controller, and determining itself as an active switch, the method further includes: sending, by the target switch to the another switch in the same stack system, a message indicating that the target switch is the active switch, so that the another switch becomes a standby switch and stops sending the registration request to the controller.

It can be learned that the target switch may further declare its active switch identity to the another switch after becoming the active switch, so that the another switch becomes the standby switch and stops sending the registration request to the controller. This can reduce signaling interaction.

In a second possible implementation of the second aspect, after the sending, by a target switch, a registration request to a controller, the method further includes: receiving, by the target switch, a query request of the controller, and sending actual stack information of the target switch and basic information of the target switch to the controller, where the actual stack information is information about a stack to which the target switch actually belongs; or receiving, by the target switch, a stack information query request of the controller, and sending actual stack information of the target switch to the controller; and receiving, by the target switch, a basic information query request of the controller, and sending basic information of the target switch to the controller.

It can be learned that the target switch may simultaneously send the actual stack information and the basic information to the controller, or separately send the actual stack information and the basic information to the controller. The separate sending manner is more targeted, and the simultaneous sending manner can reduce signaling interaction between the controller and the target switch.

In a third possible implementation of the second aspect, after the sending, by a target switch, a registration request to a controller, the method further includes: receiving, by the target switch, a registration failure message sent by the controller. A cause for a registration failure may be that the preset stack information does not match the actual stack information, or may be that there is an active switch that has been successfully registered, or may be that the basic information fails to be verified.

In a fourth possible implementation of the second aspect, the registration failure message includes information about the active switch that has successfully registered, and after knowing the information about the active switch, the target switch determines itself as a standby switch and stops sending the registration request to the controller.

It can be learned that, if there is an active switch that has been successfully registered, the registration failure message includes the information about the active switch, so that the target switch becomes the standby switch and stops sending the registration request to the controller. This reduces signaling interaction.

In a fifth possible implementation of the second aspect, the actual stack information is an identifier set of switches in the stack to which the target switch actually belongs, and an identifier can uniquely identify each switch.

In a sixth possible implementation of the second aspect, the identifier includes but is not limited to a sequence number or a MAC address.

According to a third aspect, this application provides a controller, where the controller has functions of implementing behavior of the controller in the foregoing method examples. The functions may be implemented by hardware, or implemented by executing corresponding software by hardware. The hardware or software includes one or more modules that correspond to the foregoing functions. The controller includes a processor and a transceiver. Further, the controller may include a memory. The memory is configured to be coupled with the processor and stores a program instruction and data that are necessary for the controller. The transceiver is configured to receive a registration request sent by a target switch. The target switch is one of multiple switches that send registration requests to the controller, and the multiple switches belong to a same stack system. The transceiver is further configured to: if the processor determines that the target switch meets a registration success condition, send a registration success message to the target switch. The processor is configured to select the target switch as an active switch.

It can be learned that, in this application, the controller participates in a procedure of electing the active switch. The controller receives the registration requests from the multiple switches in the same stack system and determines the first switch that meets the registration success condition as an active switch. This avoids a problem in the prior art caused by a registration failure when an active switch determined by means of switch election registers with a controller, and improves active switch election efficiency.

In a first possible implementation of the third aspect, the processor is specifically configured to: query for actual stack information of the target switch, where the actual stack information is information about a stack to which the target switch actually belongs; if the actual stack information of the target switch matches preset stack information of the controller, query whether there is an active switch that has been successfully registered, where the preset stack information is information about a stack that is preset by the controller and that includes the target switch; if there is no active switch that has been successfully registered, query for basic information of the target switch; and if the basic information of the target switch is verified, determine that the target switch meets the registration success condition.

It can be learned that there may be multiple conditions for the controller to determine whether the target switch meets the registration success condition, and when all the multiple conditions are met, it is determined that the target switch meets the registration success condition. This enriches implementations of this application.

In a second possible implementation of the third aspect, the basic information includes but is not limited to a device type, model, and version of the target switch.

It can be learned that there may be multiple conditions for the controller to determine whether the target switch meets the registration success condition, and when all the multiple conditions are met, it is determined that the target switch meets the registration success condition. This enriches implementations of this application.

In a third possible implementation of the third aspect, the transceiver is specifically configured to: send a stack information query request to the target switch and receive the actual stack information sent by the target switch, and send a basic information query request to the target switch and receive the basic information sent by the target switch.

It can be learned that the controller may obtain the actual stack information of the target switch by sending the stack information query request, and may obtain the basic information of the target switch by sending the basic information query request. This is more targeted.

In a fourth possible implementation of the third aspect, the transceiver is specifically configured to: send a query request to the target switch, where the query request is used to: obtain the actual stack information and the basic information of the target switch; and receive the actual stack information and the basic information that are sent by the target switch.

It can be learned that the controller may alternatively obtain the actual stack information and the basic information by sending one query request to the target switch. This reduces signaling interaction between the controller and the target switch.

In a fifth possible implementation of the third aspect, the processor is further configured to: if the actual stack information of the target switch does not match the preset stack information of the controller, generate an alarm information. A mismatch may occur when a stack is split, or there is a configuration error in the controller, or the like, and the alarm information may be used to notify management personnel that the stack is split or there is the configuration error.

It can be learned that this application may further be applied to stack splitting detection.

In a sixth possible implementation of the third aspect, the transceiver is further configured to: if there is an active switch that has been successfully registered, send a registration failure message to the target switch, where the registration failure message includes information about the active switch that has successfully registered.

It can be learned that, if there is an active switch that has been successfully registered, the controller may notify the target switch that an active switch already exists, so that the target switch becomes a standby switch and stops sending the registration request to the controller. This reduces signaling interaction.

In a seventh possible implementation of the third aspect, the transceiver is further configured to: if the basic information of the target switch fails to be verified, send a registration failure message to the target switch.

It can be learned that, if the basic information of the target switch fails to be verified, the controller sends the registration failure message to the target switch. This can further improve a procedure of this application.

In an eighth possible implementation of the third aspect, the actual stack information is an identifier set of switches in the stack to which the target switch actually belongs, the identifier set of the switches in the stack to which the target switch actually belongs includes an identifier of the target switch, and the processor is further configured to: query for the preset stack information according to the identifier of the target switch, where the preset stack information is an identifier set of switches in the stack to which the target switch is preset to belong; determine whether the actual stack information of the target switch matches the preset stack information of the controller; and if the identifier set of the switches in the stack to which the target switch actually belongs matches the identifier set of the switches in the stack to which the target switch is preset to belong, determine that the actual stack information of the target switch matches the preset stack information of the controller; or if the identifier set of the switches in the stack to which the target switch actually belongs does not match the identifier set of the switches in the stack to which the target switch is preset to belong, determine that the actual stack information of the target switch does not match the preset stack information of the controller.

In a ninth possible implementation of the third aspect, an identifier can uniquely identify each switch, and includes but is not limited to a sequence number or a MAC address.

According to a fourth aspect, this application provides a target switch, where the target switch has functions of implementing behavior of the target switch in the foregoing method examples. The functions may be implemented by hardware, or implemented by executing corresponding software by hardware. The hardware or software includes one or more modules that correspond to the foregoing functions. The target switch includes a processor and a transceiver. Further, the target switch may include a memory. The memory is configured to be coupled with the processor and stores a program instruction and data that are necessary for the target switch. The transceiver is configured to send a registration request to a controller when the target switch is in a no-active state. The target switch is one of multiple switches that send registration requests to the controller, and the multiple switches belong to a same stack system. The processor is configured to: if the transceiver receives a registration success message sent by the controller, select the target switch as an active switch.

It can be learned that, in this application, the target switch and another switch in the same stack system send registration requests together to the controller, and the controller also participates in a procedure of electing the active switch. This avoids a problem in the prior art caused by a registration failure when an active switch determined by means of switch election registers with a controller, and improves active switch election efficiency.

In a first possible implementation of the fourth aspect, the transceiver is further configured to send, to the another switch in the same stack system, a message indicating that the target switch is the active switch, so that the another switch becomes a standby switch and stops sending the registration request to the controller.

It can be learned that the target switch may further declare its active switch identity to the another switch after becoming the active switch, so that the another switch becomes the standby switch and stops sending the registration request to the controller. This reduces signaling interaction.

In a second possible implementation of the fourth aspect, the transceiver is further configured to: receive a query request of the controller, and send actual stack information of the target switch and basic information of the target switch to the controller, where the actual stack information is information about a stack to which the target switch actually belongs; or the transceiver is further configured to: receive a stack information query request of the controller and send the actual stack information of the target switch to the controller, and receive a basic information query request of the controller and send the basic information of the target switch to the controller.

It can be learned that the target switch may simultaneously send the actual stack information and the basic information to the controller, or separately send the actual stack information and the basic information to the controller. The separate sending manner is more targeted, and the simultaneous sending manner can reduce signaling interaction between the controller and the target switch.

In a third possible implementation of the fourth aspect, the transceiver is further configured to receive a registration failure message sent by the controller.

In a fourth possible implementation of the fourth aspect, the registration failure message includes information about the active switch that has successfully registered, the processor is further configured to: after knowing the information about the active switch, determine the target switch as a standby switch, and the transceiver is further configured to stop sending the registration request to the controller.

It can be learned that, if there is an active switch that has been successfully registered, the registration failure message includes the information about the active switch, so that the target switch becomes the standby switch and stops sending the registration request to the controller. This reduces signaling interaction.

In a fifth possible implementation of the fourth aspect, the actual stack information is an identifier set of switches in the stack to which the target switch actually belongs, and an identifier can uniquely identify each switch.

In a sixth possible implementation of the fourth aspect, the identifier includes but is not limited to a sequence number or a MAC address.

According to a fifth aspect, this application provides a system for electing an active switch, where the system includes the controller, the target switch, and the another switch that are described in the foregoing aspects, and the another switch and the target switch are in a same stack system.

According to a sixth aspect, this application provides a computer readable storage medium, where the computer readable storage medium stores an instruction, and when running on a computer, the instruction enables the computer to execute the methods described in the foregoing aspects.

According to a seventh aspect, this application provides a computer program product including an instruction, where when running on a computer, the instruction enables the computer to execute the method according to the foregoing aspects.

Compared with the prior art, in the solutions of this application, the controller also participates in a procedure of electing the active switch. This avoids a problem in the prior art caused by a registration failure when an active switch determined by means of switch election registers with a controller, and improves active switch election efficiency.

DESCRIPTION OF EMBODIMENTS

The following describes the technical solutions in the embodiments of the present invention with reference to the accompanying drawings in the embodiments of the present invention.

In the specification, claims, and accompanying drawings of the embodiments of the present invention, the terms "first", "second", "third", "fourth", and so on (if existent) are intended to distinguish between similar objects but do not necessarily describe a specific order or sequence. It should be understood that the data termed in such a way is interchangeable in proper circumstances so that the embodiments described herein can be implemented in other orders than the order illustrated or described herein. Moreover, the terms "include" and any other variants mean to cover the non-exclusive inclusion, for example, a process, method, system, product, or device that includes a series of steps or units is not necessarily limited to those expressly listed steps or units, but may include other steps or units not expressly listed or inherent to such a process, method, system, product, or device.

A cluster switch system, also referred to as a stack system, means that multiple switches are combined together and virtualized into one switch. An active switch is elected from switches that form a stack, and subsequently, the active switch is used to manage the stack system. In one aspect, a quantity of ports increases in the stack system, and a relatively wide broadband link can be established between the switches. In another aspect, the multiple switches can serve as one large switch, thereby facilitating centralized management.

Figure 1:
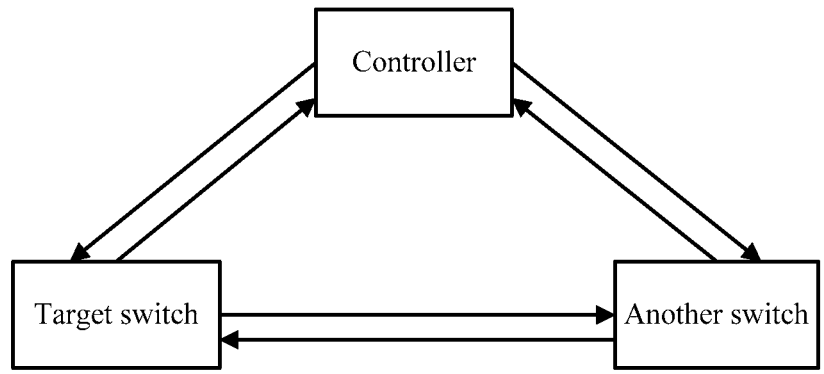
FIG. 1 is a schematic diagram of a possible network architecture according to an embodiment of the present invention.

Referring to FIG. 1, FIG. 1 shows a diagram of a possible system architecture according to an embodiment of the present invention. The system architecture includes a controller, a target switch, and another switch. The target switch and the another switch belong to a same stack system. The box in FIG. 1 with texts "another switch" may represent one switch in some embodiments or multiple switches in some other embodiments. Accordingly, the number of switches that can be represented by the box with texts "another switch" is not limited to a specific number. As used herein the term "another switch" may refer to one or more switches. The controller can mutually communicate with each switch in the stack system, and the switches can also communicate with each other. In this embodiment of the present invention, one switch needs to be elected from the stack system as an active switch, so as to implement centralized management of the stack system.

Figure 2A:
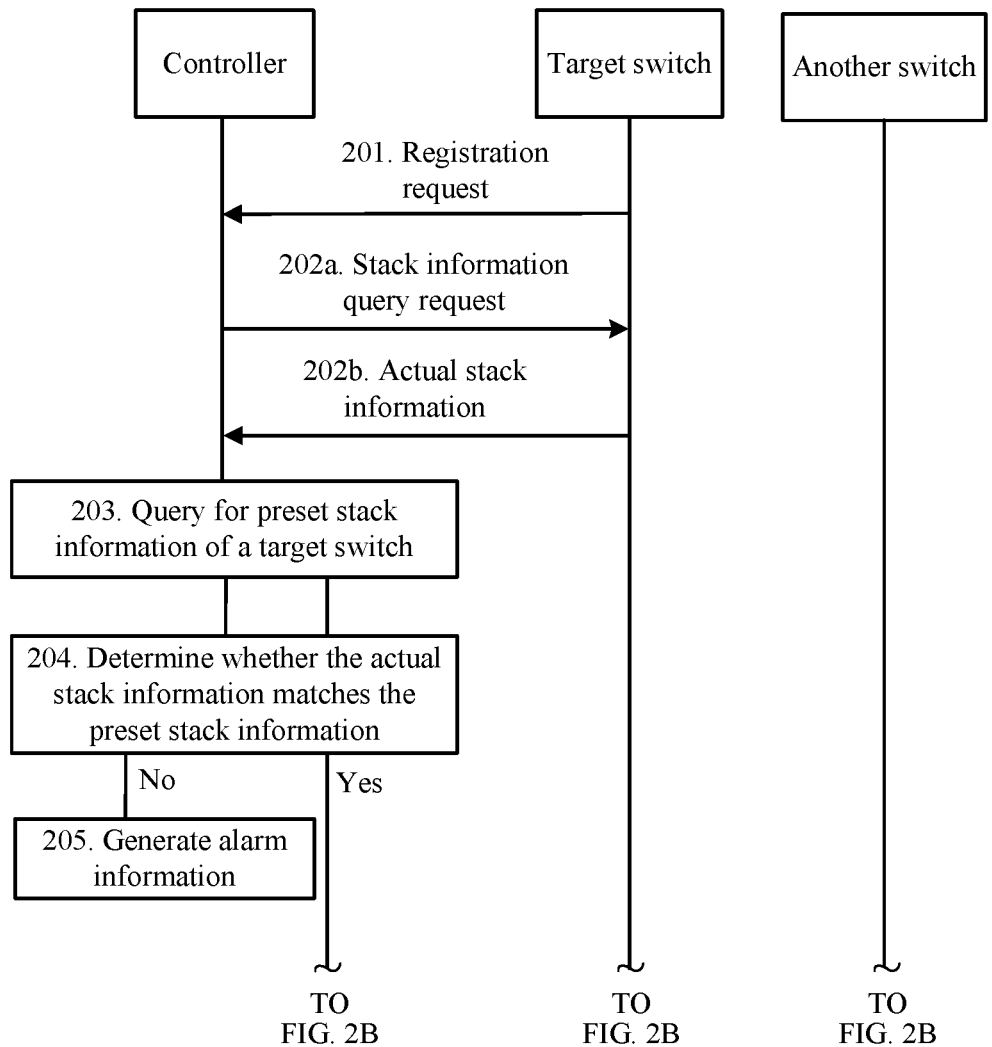
FIG. 2A and FIG. 2B are a schematic communication diagram of a data processing method according to an embodiment of the present invention.
Figure 2B:
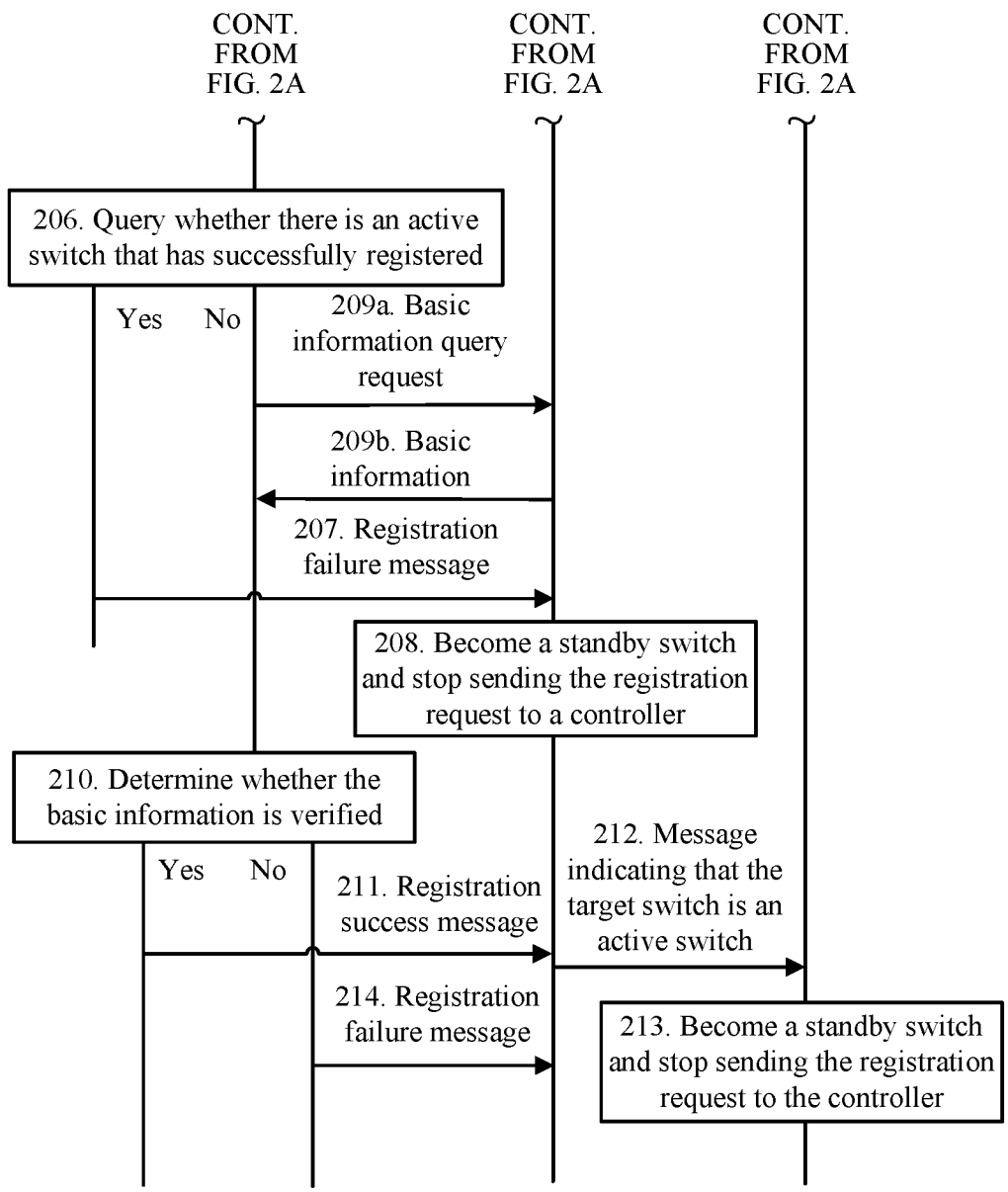

Referring to FIG. 2A and FIG. 2B, an embodiment of a data processing method provided in an embodiment of the present invention includes the following steps.

201. A controller receives a registration request sent by a target switch.

The target switch sends the registration request to the controller when there is no active switch. Correspondingly, the controller receives the registration request sent by the target switch. It can be understood that, the controller receives registration requests of multiple switches in a same stack system when there is no active switch, and the target switch is merely one switch in the stack system. The controller also receives a registration request of another switch in the stack system, and sequentially performs processing according to a request receiving sequence or performs processing according to a preset priority.

Specifically, in this embodiment of the present invention, a switch in the stack system sends a registration request to the controller when there is no active switch. A state when there is no active switch may be referred to as "no-active state" and may occur during one or more of the following several scenarios. In one scenario, switches in the stack system are just powered on. Because all the switches in the stack system are just powered on, no active switch has been elected, and the stack system is in the no-active state; in other words, switches in the system is in the no-active state. In another scenario, the active switch is faulty, but the active switch is still connected to a standby switch. The active switch sends, to the standby switch, a message indicating that the active switch loses an active switch identity, and the stack system changes back to the no-active state from an active state, in other words, switches in the system changes to the no-active state. In still another scenario, the active switch has been disconnected from the standby switch. A disconnection cause may be that a link between the active switch and the standby switch is faulty, or may be that the active switch is faulty. The standby switch may detect a disconnection from the active switch and determine that the stack system is in the no-active state. In the no-active state, the switches in the stack system send the registration requests to the controller at the same time or according to a preset sequence, to reelect an active switch.

202. The controller queries for actual stack information of the target switch.

Specifically, that the controller queries for the actual stack information of the target switch may include step 202a and step 202b.

202a. The controller sends a stack information query request to the target switch.

Correspondingly, the target switch receives the stack information query request sent by the controller.

202b. The controller receives the actual stack information sent by the target switch.

Correspondingly, the target switch sends the actual stack information of the target switch to the controller.

The actual stack information is information about a stack to which the target switch actually belongs. Because the switches in the same stack system are connected to each other, the target switch may record information about another switch that is connected to the target switch. That is, the target switch stores the information about the stack to which the target switch actually belongs.

Specifically, the actual stack information includes an identifier set of switches in the stack to which the target switch actually belongs. An identifier can uniquely identify each switch, and includes but is not limited to a sequence number, a MAC address, or the like of the switch. This is not limited herein.

203. The controller queries for preset stack information of the target switch.

The preset stack information is a set of identifiers of switches in a preset stacking system to which the target switch belongs. A switch identifier can uniquely identify each switch, and includes but is not limited to a sequence number, a MAC address, or the like of the switch. This is not limited herein.

Because the actual stack information includes an identifier of the target switch, the controller may query for the preset stack information of the target switch according to the identifier of the target switch.

204. The controller determines whether the actual stack information matches the preset stack information.

Specifically, that the actual stack information matches the preset stack information means that the identifier set included in the actual stack information is the same as the identifier set included in the preset stack information, and specifically means that both quantities of included switches and identifiers of the switches are the same. The controller may first determine whether the quantities of the switches in the actual stack information and in the preset stack information are the same, and when the quantities are the same, determine whether the identifiers are the same. A specific implementation is not limited herein.

If the identifier set of the switches in the stack to which the target switch actually belongs matches an identifier set of switches in the stack to which the target switch is preset to belong, the controller determines that the actual stack information of the target switch matches the preset stack information of the controller, and step 206 is performed.

If the identifier set of the switches in the stack to which the target switch actually belongs does not match the identifier set of the switches in the stack to which the target switch is preset to belong, the controller determines that the actual stack information of the target switch does not match the preset stack information of the controller, and step 205 is performed.

205. The controller generates alarm information.

Specifically, a case in which the actual stack information does not match the preset stack information includes: If the identifier set included in the actual stack information is a subset of the identifier set included in the preset stack information, it indicates that stack splitting occurs. In this case, the controller generates splitting alarm information.

It should be noted that, in some other implementations, an active switch of a split stack can still continue to be elected in a case of stack splitting, and step 206 may continue to be performed after step 205.

A case in which the actual stack information does not match the preset stack information further includes: If the actual stack information includes an identifier that does not exist in the preset stack information, it indicates that there is a connection error in an actual stack, or that there is an error in the preset stack information. In this case, regardless of whether a quantity of identifiers in the identifier set included in the actual stack information is greater than, equal to, or less than a quantity of identifiers in the identifier set included in the preset stack information, the controller generates configuration error alarm information, and waits for intervention of management personnel.

206. The controller queries whether there is an active switch that has been successfully registered.

After determining a switch that has successfully registered, the controller modifies label information of the switch in the preset stack information, to identify that the switch is the active switch. The controller may determine, by querying label information of each switch in the preset stack information, whether there is the active switch that has successfully registered. If there is no active switch that has been successfully registered, step 209 and step 210 are performed. If there is an active switch that has been successfully registered, step 207 and step 208 are performed.

207. The controller sends a registration failure message to the target switch.

Correspondingly, the target switch receives the registration failure message sent by the controller. The registration failure message includes information about the active switch that has successfully registered.

It should be noted that, after receiving a registration success message, the switch that has successfully registered declares its active switch identity to the another switch in the stack system, so that the another switch stops sending the registration request to the controller. However, the target switch may have not received an identity declaration message of the active switch until the target switch sends the registration request. Therefore, even if there is an active switch that has been successfully registered, the target switch may still receive the registration failure message.

208. The target switch becomes a standby switch and stops sending the registration request to the controller.

After obtaining the information about the active switch from the registration failure message, the target switch automatically becomes the standby switch and stops sending the registration request to the controller. Specifically, the target switch may modify label information to identify itself as a standby switch. The description about the target switch modifying label information in this paragraph is not intended to be limiting.

209. The controller queries for basic information of the target switch.

Specifically, step 209 may include step 209a and step 209b.

209a. The controller sends a basic information query request to the target switch.

Correspondingly, the target switch receives the basic information query request sent by the controller.

209b. The controller receives the basic information of the target switch sent by the target switch.

Correspondingly, the target switch sends the basic information of the target switch to the controller.

The basic information includes but is not limited to a device type, model, and version of the target switch.

In this embodiment, the target switch sends the actual stack information of the target switch to the controller after receiving the stack information query request of the controller, and the target switch sends the basic information of the target switch to the controller after receiving the basic information query request of the controller. In some possible implementations, the controller may send only one query request. The query request is used to obtain the actual stack information and the basic information of the target switch. Correspondingly, after receiving the query request, the target switch sends the actual stack information and the basic information of the target switch to the controller. The description about the target switch sending actual stack information in this paragraph is not intended to be limiting.

210. The controller determines whether the basic information is verified.

Specifically, the controller presets the basic information of the target switch. If the basic information that is of the target switch and preset by the controller matches the basic information sent by the target switch, the controller determines that the basic information of the target switch is verified, and step 211 to step 213 are performed. If the basic information that is of the target switch and preset by the controller does not match the basic information sent by the target switch, step 214 is performed.

211. The controller sends a registration success message to the target switch.

Correspondingly, the target switch receives the registration success message sent by the controller and determines itself as an active switch. It should be noted that, the controller may identify the target switch as an active switch by modifying label information that is of the target switch and preset on the controller, and identify the another switch in the same stack system as a standby switch. In this way, the controller can identify, according to the label information of the switch, which switch is the active switch. Similarly, the target switch may also identify itself as an active switch by modifying label information preset on the target switch.

212. The target switch sends, to another switch, a message indicating that the target switch is an active switch.

After becoming the active switch, the target switch sends, to the another switch in the same stack system, a notification message indicating that the target switch becomes the active switch, so as to declare that the target switch has the active switch identity. Correspondingly, after receiving the notification message, the another switch identifies itself as a standby switch if the another switch is still in the no-active state.

213. The another switch becomes a standby switch and stops sending the registration request to the controller.

It should be noted that the another switch may identify itself as a standby switch by modifying preset label information.

214. The controller sends a registration failure message to the target switch.

Correspondingly, the target switch receives the registration failure message sent by the controller. Different from step 207, the registration failure message does not include the information about the active switch, and the target switch continues to send the registration request to the controller after receiving the registration failure message.

In this embodiment of the present invention, the controller also participates in a procedure of electing the active switch. This avoids a problem in the prior art caused by a registration failure when an active switch determined by means of switch election registers with a controller, and improves active switch election efficiency. In addition, this embodiment of the present invention may further be applied to stack splitting detection and alarm generation.

The foregoing mainly describes the solutions in the embodiments of the present invention from a perspective of interaction between devices. It can be understood that, to implement the foregoing functions, each device, such as the controller or the target switch, includes a corresponding hardware structure and/or software module for performing each function. A person skilled in the art may be aware that, in combination with the example units and algorithm steps described in the embodiments disclosed in this specification, the embodiments of the present invention can be implemented by hardware or a combination of hardware and computer software. Whether a function is performed by hardware or in a form of computer software-driven hardware depends on particular applications and design constraint conditions of the technical solutions. For the particular applications, a person skilled in the art may use different methods to achieve the described functions, but it should not be considered that the implementation goes beyond the scope of the embodiments of the present invention.

Division of functional units may be performed on the controller, the target switch, and the like according to the foregoing method examples in the embodiments of the present invention. For example, each functional unit may be divided according to each function, or at least two functions may be integrated into one processing unit. The integrated unit may be implemented in a form of hardware, or may be implemented in a form of a software functional unit. It should be noted that the unit division in the embodiments of the present invention is an example, and is merely logical function division and may be other division in actual implementation.

Figure 3A:
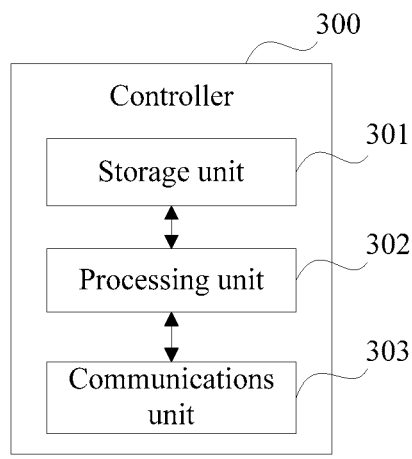
FIG. 3A is a schematic block diagram of a controller according to an embodiment of the present invention.

FIG. 3A shows a possible schematic structural diagram of a controller. The controller 300 includes a processing unit 302 and a communications unit 303. The processing unit 302 is configured to control and manage actions of the controller 300. For example, the processing unit 302 is configured to support the controller 300 to perform step 203 to step 206, and step 210 in FIG. 2A and FIG. 2B, and/or another process of the technology described in this specification. The communications unit 303 is configured to support communication between the controller 300 and another network device, for example, communication between the target switch, the another switch, and the like shown in FIG. 2A and FIG. 2B, and may be specifically configured to perform step 201 and step 202, step 207, step 209, step 211, and step 214 in FIG. 2A and FIG. 2B. The controller 300 may further include a storage unit 301, configured to store program code and data of the controller 300.

The processing unit 302 may be a processor, including a general purpose processor, for example, a central processing unit (English: Central Processing unit, CPU for short) or a network processor (NP), or may include a hardware chip, for example, an application-specific integrated circuit (English: Application-Specific Integrated Circuit, ASIC for short), a programmable logic device (English: programmable logic device, PLD for short), or a combination thereof. The PLD may be a complex programmable logic device (English: complex programmable logic device, CPLD for short), a field-programmable logic gate array (English: field-programmable gate array, FPGA for short), a generic array logic (English: generic array logic, GAL for short), or any combination thereof. The processing unit 302 may implement or execute various example logical blocks, modules, and circuits described with reference to content disclosed in the embodiments of the present invention. Alternatively, the processor may be a combination implementing a computing function, for example, a combination including one or more microprocessors, or a combination of a digital information processor and a microprocessor.

The communications unit 303 includes a communications interface, a transceiver, a transceiver circuit, and the like. The communications interface is a general term and may include one or more interfaces. The communications interface may be a wired communications interface, a wireless communications interface, or a combination thereof, and the wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The storage unit 301 may be a memory, including a volatile memory (English: volatile memory), for example, a random-access memory (English: random-access memory, RAM for short). Alternatively, the memory may include a non-volatile memory (English: non-volatile memory), for example, a flash memory (English: flash memory), a hard disk drive (English: hard disk drive, HDD for short), or a solid-state drive (English: solid-state drive, SSD for short). Alternatively, the memory may include a combination of the foregoing types of memories.

Figure 3B:
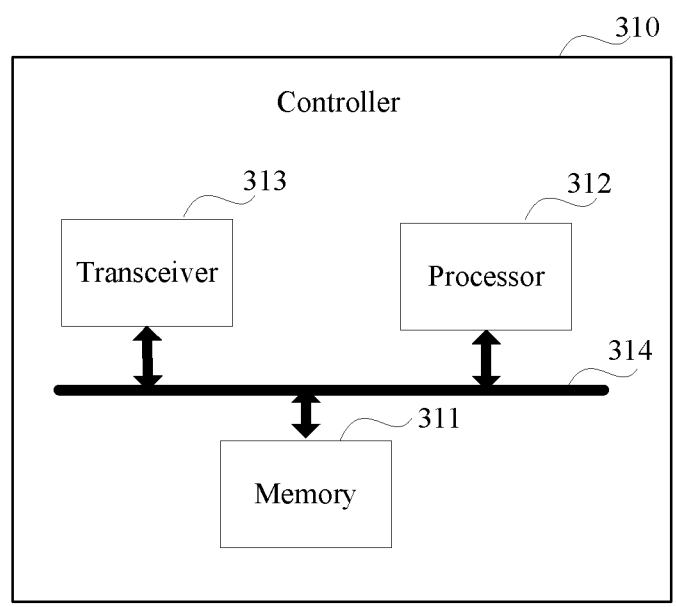
FIG. 3B is a schematic structural diagram of a controller according to an embodiment of the present invention.

When the processing unit 302 is a processor, the communications unit 303 is a transceiver, and the storage unit 301 is a memory, the controller in the embodiments of the present invention may be a controller shown in FIG. 3B.

Referring to FIG. 3B, the controller 310 includes a processor 312, a transceiver 313, and a memory 311. Optionally, the controller 310 may further include a bus 314. The transceiver 313, the processor 312, and the memory 311 may be connected to each other by using the bus 314. The bus 314 may be classified into an address bus, a data bus, a control bus, and the like. For ease of representation, only one thick line is used to represent the bus 314 in FIG. 3B, but this does not mean that there is only one bus or only one type of bus.

Figure 4A:
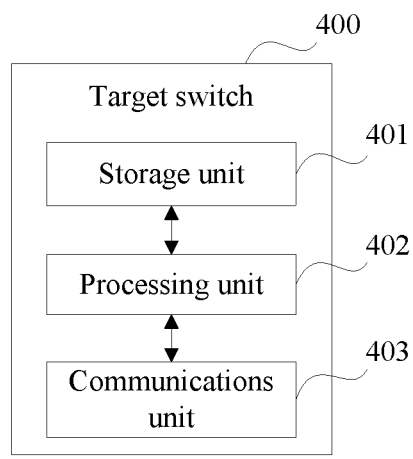
FIG. 4A is a schematic block diagram of a switch according to an embodiment of the present invention.

FIG. 4A shows a possible schematic structural diagram of a target switch. The target switch 400 includes a processing unit 402 and a communications unit 403. The processing unit 402 is configured to control and manage actions of the target switch 400. For example, the processing unit 402 is configured to support the target switch 400 to perform step 208 in FIG. 2A and FIG. 2B, and/or another process of the technology described in this specification. The communications unit 403 is configured to support communication between the target switch 400 and another network device, for example, communication between the controller, the another switch, and the like shown in FIG. 2A and FIG. 2B, and may be specifically configured to perform step 201 and step 202, step 207, step 209, step 211 and step 212, and step 214 in FIG. 2A and FIG. 2B. The target switch 400 may further include a storage unit 401, configured to store program code and data of the target switch 400.

The processing unit 402 may be a processor, including a general purpose processor, for example, a central processing unit or a network processor, or may include a hardware chip, for example, an application-specific integrated circuit, a programmable logic device, or a combination thereof. The programmable logic device may be a complex programmable logic device, a field-programmable gate array, a generic array logic, or any combination thereof. The processing unit 402 may implement or execute various example logical blocks, modules, and circuits described with reference to content disclosed in the embodiments of the present invention. Alternatively, the processor may be a combination implementing a computing function, for example, a combination including one or more microprocessors, or a combination of a digital information processor and a microprocessor.

The communications unit 403 includes a communications interface, a transceiver, a transceiver circuit, and the like. The communications interface is a general term and may include one or more interfaces. The communications interface may be a wired communications interface, a wireless communications interface, or a combination thereof, and the wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The storage unit 401 may be a memory, including a volatile memory, for example, a random-access memory. Alternatively, the memory may include a non-volatile memory, for example, a flash memory, a hard disk drive, or a solid-state drive. Alternatively, the memory may include a combination of the foregoing types of memories.

Figure 4B:
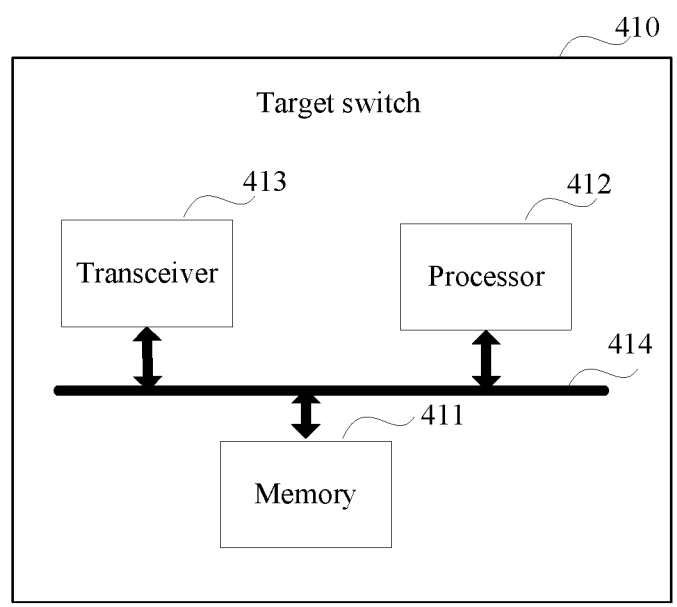
FIG. 4B is a schematic structural diagram of a switch according to an embodiment of the present invention.

When the processing unit 402 is a processor, the communications unit 403 is a transceiver, and the storage unit 401 is a memory, the target switch in the embodiments of the present invention may be a target switch shown in FIG. 4B.

Referring to FIG. 4B, the target switch 410 includes a processor 412, a transceiver 413, and a memory 411. Optionally, the target switch 410 may further include a bus 414. The transceiver 413, the processor 412, and the memory 411 may be connected to each other by using the bus 414. The bus 414 may be classified into an address bus, a data bus, a control bus, and the like. For ease of representation, only one thick line is used to represent the bus 414 in FIG. 4B, but this does not mean that there is only one bus or only one type of bus.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions described in the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A data processing method, comprising:
   receiving, by a controller, a registration request sent by a target switch, wherein the target switch is one of multiple switches that send registration requests to the controller, and the multiple switches belong to a same stack system;
   when there is no active switch that has been successfully registered, querying, by the controller, for basic information of the target switch;
   based on the basic information of the target switch being verified, determining, by the controller, that the target switch meets the registration success condition; and
   in response to the controller determining that the target switch meets a registration success condition, sending, by the controller, a registration success message to the target switch, and selecting the target switch as an active switch.

2. The data processing method according to claim 1, wherein the controller determines that the target switch meets a registration success condition comprises:
   querying, by the controller, for actual stack information of the target switch, wherein the actual stack information is information about a stack to which the target switch actually belongs; and
   if the actual stack information of the target switch matches preset stack information of the controller, querying, by the controller, whether there is an active switch that has been successfully registered, wherein the preset stack information is information about a stack that is preset by the controller and that comprises the target switch.

3. The data processing method according to claim 2, wherein after the querying, by the controller, whether there is an active switch that has been successfully registered, the method further comprises:
   if there is an active switch that has been successfully registered, sending, by the controller, a registration failure message to the target switch, wherein the registration failure message comprises information about the active switch that has successfully registered.

4. The data processing method according to claim 2, wherein the actual stack information is an identifier set of switches in the stack to which the target switch actually belongs, the identifier set of the switches in the stack to which the target switch actually belongs comprises an identifier of the target switch, and after the querying, by the controller, for actual stack information of the target switch, the method further comprises:
  querying, by the controller, for the preset stack information according to the identifier of the target switch, wherein the preset stack information is an identifier set of switches in the stack to which the target switch is preset to belong;
  determining, by the controller, whether the actual stack information of the target switch matches the preset stack information of the controller;
  if the identifier set of the switches in the stack to which the target switch actually belongs matches the identifier set of the switches in the stack to which the target switch is preset to belong, determining, by the controller, that the actual stack information of the target switch matches the preset stack information of the controller; and
  if the identifier set of the switches in the stack to which the target switch actually belongs does not match the identifier set of the switches in the stack to which the target switch is preset to belong, determining, by the controller, that the actual stack information of the target switch does not match the preset stack information of the controller.

5. The data processing method according to claim 2, wherein the querying, by the controller, for actual stack information of the target switch comprises: sending, by the controller, a stack information query request to the target switch, and receiving, by the controller, the actual stack information sent by the target switch; and, wherein
  the querying, by the controller, for basic information of the target switch comprises: sending, by the controller, a basic information query request to the target switch, and receiving, by the controller, the basic information sent by the target switch.

6. The data processing method according to claim 2, wherein the querying, by the controller, for actual stack information of the target switch comprises:
  sending, by the controller, a query request to the target switch, where the query request is used to obtain the actual stack information and the basic information of the target switch; and
  receiving, by the controller, the actual stack information and the basic information that are sent by the target switch.

7. The data processing method according to claim 2, after the querying, by the controller, for basic information of the target switch, the method further comprises:
  sending, by the controller, a registration failure message to the target switch when the basic information of the target switch fails to be verified.

8. The data processing method according to claim 2, after the querying, by the controller, for actual stack information of the target switch, the method further comprises:
  generating, by the controller, an alarm information when the actual stack information of the target switch does not match the preset stack information of the controller.

9. A controller comprising:
  a memory;
  a processor coupled to the memory; and
  a transceiver; wherein
  the transceiver is configured to receive a registration request sent by a target switch, wherein the target switch is one of multiple switches that send registration requests to the controller, and the multiple switches belong to a same stack system;
  the processor is configured to:
    query for basic information of the target switch when there is no active switch that has been successfully registered;
    determine whether the target switch meets a registration success condition based on verifying the basic information of the target switch; and
    select the target switch as an active switch when the target switch meets the registration success condition; and
  the transceiver is further configured to send a registration success message to the target switch when the processor determines that the target switch meets the registration success condition.

10. The controller according to claim 9, wherein the processor is configured to:
  query for actual stack information of the target switch, wherein the actual stack information is information about a stack to which the target switch actually belongs; and
  query whether there is an active switch that has been successfully registered when the actual stack information of the target switch matches preset stack information of the controller, wherein the preset stack information is information about a stack that is preset by the controller and that comprises the target switch.

11. The controller according to claim 10, the transceiver is further configured to send a registration failure message to the target switch when there is an active switch that has been successfully registered, wherein the registration failure message comprises information about the active switch that has successfully registered.

12. The controller according to claim 10, wherein the actual stack information is an identifier set of switches in the stack to which the target switch actually belongs, the identifier set of the switches in the stack to which the target switch actually belongs comprises an identifier of the target switch; wherein the processor is further configured to:
  query for the preset stack information according to the identifier of the target switch, wherein the preset stack information is an identifier set of switches in the stack to which the target switch is preset to belong;
  determine whether the actual stack information of the target switch matches the preset stack information of the controller;
  determine that the actual stack information of the target switch matches the preset stack information of the controller when the identifier set of the switches in the stack to which the target switch actually belongs matches the identifier set of the switches in the stack to which the target switch is preset to belong; and
  determine that the actual stack information of the target switch does not match the preset stack information of the controller when the identifier set of the switches in the stack to which the target switch actually belongs does not match the identifier set of the switches in the stack to which the target switch is preset to belong.

13. The controller according to claim 10, wherein the transceiver is further configured to:
  send a query request to the target switch, where the query request is used to obtain the actual stack information and the basic information of the target switch; and
  receive the actual stack information and the basic information that are sent by the target switch.

14. The controller according to claim 10, wherein the transceiver is further configured to:
send a stack information query request to the target switch, and receive the actual stack information sent by the target switch; and
send a basic information query request to the target switch, and receive the basic information sent by the target switch.

15. The controller according to claim 10, the transceiver is configured to send a registration failure message to the target switch when the basic information of the target switch fails to be verified.

16. The controller according to claim 10, wherein the processor is configured to generate an alarm information when the actual stack information of the target switch does not match the preset stack information of the controller.

17. A switch in a stack system, comprising:
a memory;
a processor coupled to the memory; and
a transceiver; wherein
the transceiver is configured to send a registration request to a controller when there is no active switch, wherein the switch is one of multiple switches that send registration requests to the controller, and the multiple switches belong to a same stack system;
the processor is configured to:
cause basic information of the switch to be transmitted to the controller, wherein the controller requests the basic information in response to determining that no active switch is currently registered; and
determine the switch as an active switch in response to receiving a registration success message sent by the controller based on verification of the basic information provided by the switch.

18. The switch according to claim 17, wherein the transceiver is further configured to send actual stack information of the switch and basic information of the switch to the controller according to a query request of the controller, wherein the actual stack information is information about a stack to which the switch actually belongs.

19. The switch according to claim 17, wherein the processor is configured to send a message to another switch in the same stack system after determining the switch as the active switch, to indicate that the switch is the active switch, such that the another switch becomes a standby switch and stops sending the registration request to the controller.

20. The switch according to claim 17, wherein the processor is further configured to: determine the switch as a standby switch when the switch receives a registration failure message sent by the controller, wherein the registration failure message comprises information about an active switch that has been successfully registered.

* * * * *